United States Patent
Spicer et al.

(10) Patent No.: US 8,083,540 B1
(45) Date of Patent: Dec. 27, 2011

(54) PHOTOVOLTAIC MODULE CONNECTOR ASSEMBLIES HAVING CABLE STRAIN RELIEF

(75) Inventors: Michael J. Spicer, Lancaster, PA (US); David T. Wilson, Jacobus, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 13 days.

(21) Appl. No.: 12/794,311

(22) Filed: Jun. 4, 2010

(51) Int. Cl.
*H01R 13/58* (2006.01)
(52) U.S. Cl. ....................................... 439/460
(58) Field of Classification Search .............. 439/460, 439/567, 374, 492, 276, 936, 502, 505, 135, 439/468
See application file for complete search history.

(56) References Cited

U.S. PATENT DOCUMENTS

| | | | |
|---|---|---|---|
| 5,280,133 A * | 1/1994 | Nath | 174/373 |
| 6,582,249 B1 * | 6/2003 | Boeck et al. | 439/492 |
| 7,285,006 B1 | 10/2007 | Daily et al. | |
| 7,291,036 B1 | 11/2007 | Daily et al. | |
| 7,442,077 B2 * | 10/2008 | Peress et al. | 439/505 |
| 7,762,832 B2 * | 7/2010 | Minnick | 439/374 |
| 7,780,472 B2 * | 8/2010 | Lenox | 439/567 |
| 2004/0147172 A1 * | 7/2004 | Brown et al. | 439/701 |
| 2008/0110490 A1 | 5/2008 | Duesterhoeft | |
| 2009/0084570 A1 | 4/2009 | Gherardini et al. | |
| 2010/0105245 A1 | 4/2010 | Good et al. | |

OTHER PUBLICATIONS

SOLARLOK Photovoltaic Interconnection System; SOLARLOK Photovoltaic Interconnection System; Catalog 889753.3; Revised Sep. 2009, 40 pgs.

\* cited by examiner

*Primary Examiner* — Edwin A. Leon

(57) ABSTRACT

An electrical connector assembly including a connector housing having a plurality of sides that define an inner region of the connector housing and include opposite loading and mating sides. The connector housing has a cable channel located in the inner region that extends between the loading and mating sides and a slot oriented substantially transverse to the cable channel. The slot extends through the cable channel. The connector assembly also includes a conductive cable that is received in the cable channel and extends along a central cable axis. The conductive cable has an outer surface and is configured to electrically engage the PV module. The connector assembly also includes a retaining member that is inserted into the slot. The retaining member surrounds the conductive cable about the cable axis and grips the outer surface of the conductive cable.

20 Claims, 6 Drawing Sheets

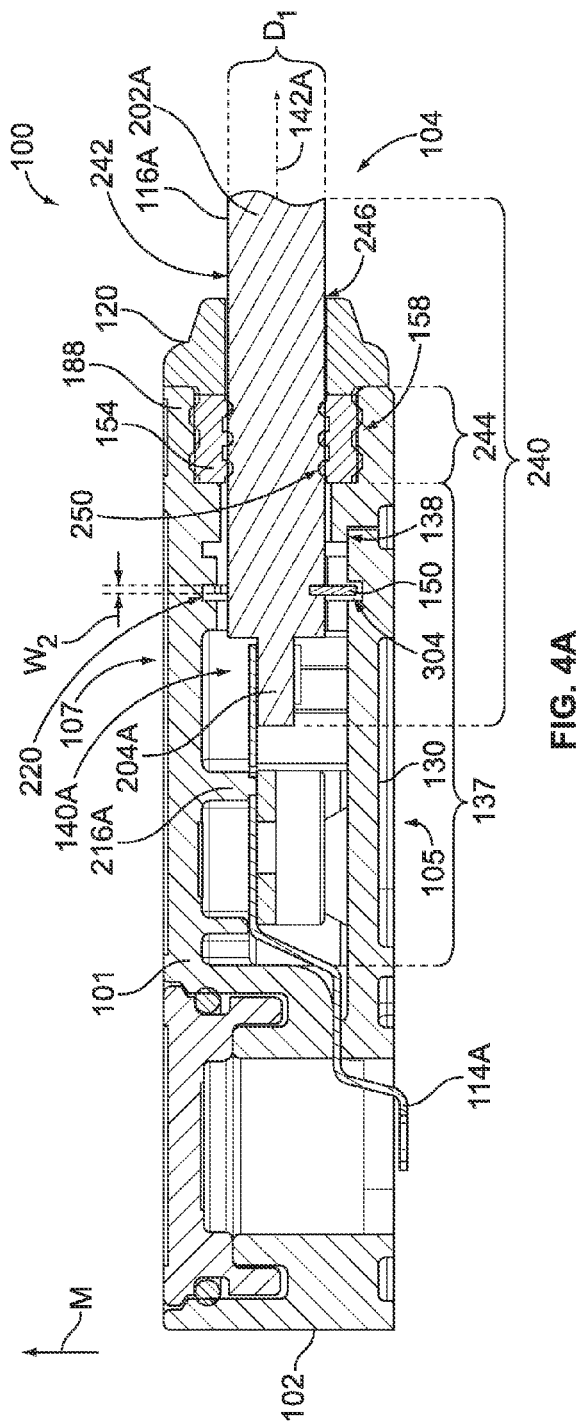
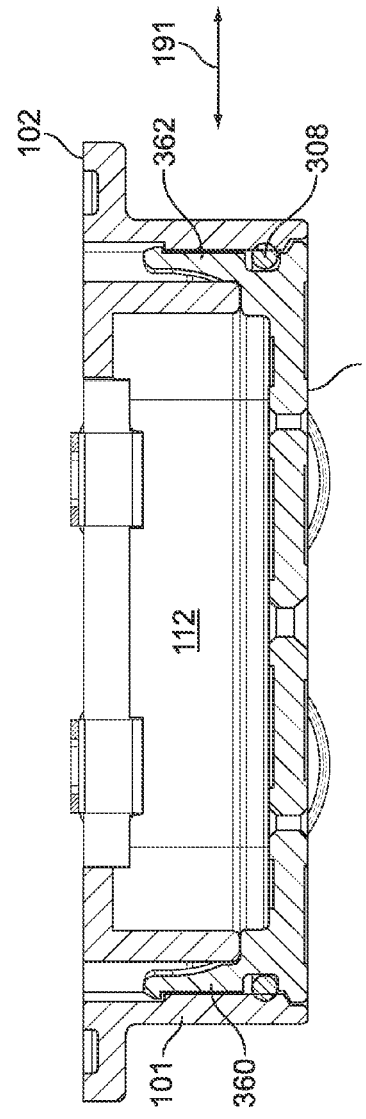
FIG. 4A
FIG. 4B

PHOTOVOLTAIC MODULE CONNECTOR ASSEMBLIES HAVING CABLE STRAIN RELIEF

BACKGROUND OF THE INVENTION

The subject matter herein relates generally to electrical connector assemblies, and more particularly, to electrical connector assemblies configured to interconnect photovoltaic (PV) modules to an energy delivery system.

Photovoltaic (PV) modules include PV cells that convert light energy (e.g., solar energy) into electrical energy. Several PV modules may be interconnected to each other in an array. For example, a building roof or another type of support structure may hold numerous PV modules arranged side-by-side and interconnected to each other. The PV modules are generally electrically connected to an energy system through corresponding electrical connector assemblies. The electrical connector assemblies may be referred to as junction boxes. A conventional junction box may include one or more pairs of foil contacts that electrically engage a corresponding PV module. The foil contacts are typically located within a housing and are electrically connected to other connector assemblies through conductive cables. The conductive cables are electrically connected to the foil contacts within the housing and extend through a wall or side to an exterior of the housing.

It is generally desirable to protect the foil contacts, the conductive cables, and other internal components from unwanted moisture or contaminants. During the assembly of some known junction boxes, the conductive cables are inserted through holes in a side of the junction box and into an interior of the junction box. Once located in the junction box, barrels may be compressed or crimped around corresponding conductive cables. The crimped barrels effectively increase a diameter of the conductive cables and prevent the conductive cables from being inadvertently withdrawn or removed through the same holes of the junction box. However, crimping barrels around conductive cables inside the junction box may be costly and require additional steps for assembling the junction box. In other junction boxes, it may be possible for internal components, such as conductive cables, to be located within the junction box through an over-molding process. For example, the internal components may first be positioned in a predetermined arrangement with respect to each other and then a housing material may be molded around the internal components. However, junction boxes constructed from the above over-molding process may be susceptible to leaking because a material used in the over-molding process and the composition of the conductive cables may not properly bond together to prevent the leaking.

Accordingly, there is a need for alternative electrical connector assemblies, such as junction boxes, that protect internal components from unwanted moisture and contaminants. Furthermore, there is a need for electrical connector assemblies that are capable of being constructed in a more simple and/or cost-efficient manner with respect to known electrical connector assemblies.

BRIEF DESCRIPTION OF THE INVENTION

In one embodiment, an electrical connector assembly is provided that is configured to have a photovoltaic (PV) module mounted thereon. The connector assembly includes a connector housing that has a plurality of sides that define an inner region of the connector housing and include opposite loading and mating sides. The connector housing has a cable channel located in the inner region that extends between the loading and mating sides and a slot oriented substantially transverse to the cable channel. The slot extends through the cable channel. The connector assembly also includes a conductive cable that is received in the cable channel and extends along a central cable axis. The conductive cable has an outer surface, and the conductive cable is configured to electrically engage the PV module. The connector assembly also includes a retaining member that is inserted into the slot. The retaining member surrounds the conductive cable about the cable axis and grips the outer surface of the conductive cable. The retaining member prevents the conductive cable from being inadvertently moved with respect to the connector housing in a direction along the cable axis.

Optionally, the connector assemblies may include a plurality of such conductive cables and retaining members. For example, embodiments described herein may include one or more pairs of conductive cables where each conductive cable is held within the housing by one or more retaining members.

In another embodiment, an electrical connector assembly that is configured to be mounted to a photovoltaic (PV) module is provided. The connector assembly includes a plurality of housing sides including opposite loading and mating sides and a mounting surface that extends between the loading and mating sides. The connector assembly also includes a cable channel that extends between the loading and mating sides along the mounting surface. The cable channel is sized and shaped to receive a conductive cable so that the conductive cable extends along a cable axis when located within the cable channel. The connector assembly also includes a slot that is sized and shaped to have a retaining member inserted therein. The slot is oriented substantially transverse to the cable channel so that the retaining member extends substantially transverse to the cable axis. The slot opens to the mounting surface so that the retaining member is insertable into the slot in a mounting direction that is orthogonal to the cable axis. The connector assembly also includes a cover that is configured to be mounted to the mounting surface. The cover holds the conductive cable and the retaining member within the cable channel and the slot, respectively, when mounted to the mounting surface.

BRIEF DESCRIPTION OF THE DRAWINGS

FIG. 4A is a cross-section of the connector assembly of FIG. 1 illustrating a conductive cable held by a retaining member of the connector assembly.

FIG. 4B is a cross-section of the connector assembly of FIG. 1 through a power recess of the connector assembly.

DETAILED DESCRIPTION OF THE INVENTION

Figure 1:
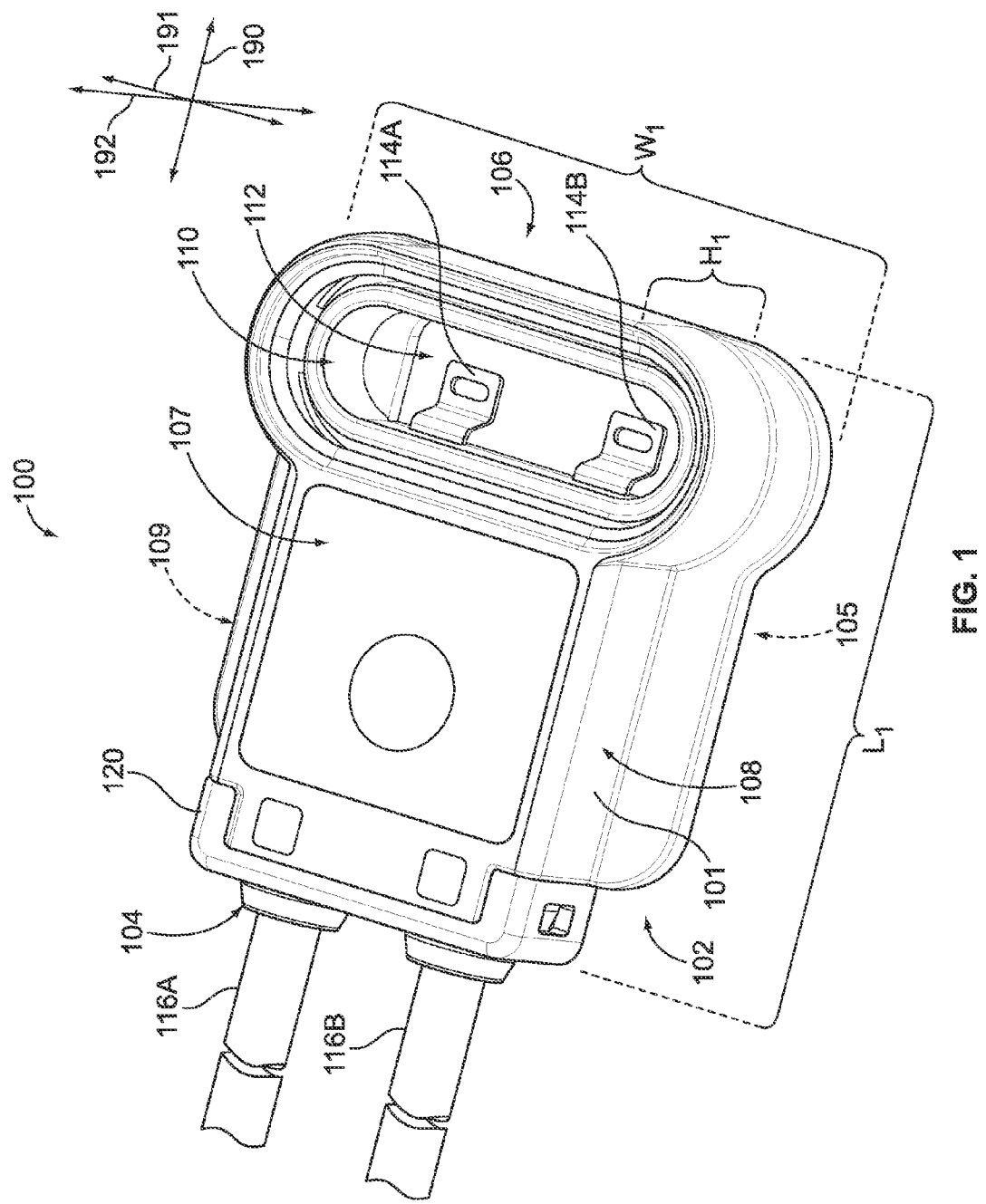
FIG. 1 is a perspective view of an electrical connector assembly formed in accordance with one embodiment.

FIG. 1 is a perspective view of an electrical connector assembly 100 formed in accordance with one embodiment. The connector assembly 100 is oriented with respect to a longitudinal axis 190, a lateral axis 191, and a mounting axis 192 that are mutually perpendicular with respect to each other. The connector assembly 100 includes a connector housing 102 that has a plurality of housing sides 104-109. The housing sides 104-109 can include opposite loading and mating sides 104 and 106, a mounting side 105, a non-mounting side 107, and opposite walls sides 108 and 109. The loading side 104 is located opposite to the mating side 106 and is configured to receive one or more conductive cables 116A and 116B. The mounting side 105, the non-mounting side 107, and the wall sides 108 and 109 may extend parallel to the longitudinal axis 190 between the loading and mating sides 104 and 106.

In the illustrated embodiment, the connector housing 102 may be assembled from separate components, including a main body 101, a housing cap 120, a recess plug 306 (FIG. 2B), and a cover 130. However, in alternative embodiments, one or more of the components may be integrally formed (e.g., a single part may comprise the main body 101 and the housing cap 120) or the entire connector housing 102 may be integrally formed (e.g., through an over-molding process). As shown, the main body 101 may include the wall sides 108 and 109, the non-mounting side 107, and the mating side 106. Furthermore, the housing cap 120 may include the loading side 104, and the cover 130 may form a portion of the mounting side 105. Also shown, the connector housing 102 may include an access window 110 through the non-mounting side 107 that provides access to a power recess 112 having mating contacts 114A and 114B therein. The recess plug 306 (FIG. 2B) may be inserted through the access window 110 and coupled to the main body 101. The mating contacts 114A and 114B are electrically connected to the conductive cables 116A and 116B, respectively.

In the exemplary embodiment, the connector assembly 100 is configured to mate with a photovoltaic (PV) module (not shown) along the mounting side 105. The PV module is configured to convert light or solar energy into electric potential or current. When mounted onto the mounting side 105, the PV module may electrically connect with the mating contacts 114A and 114B in the power recess 112. Accordingly, in some embodiments, the connector assembly 100 may be referred to as a junction box. The electric potential or current generated by the PV module is transmitted through the connector assembly 100 and, more particularly, through the mating contacts 114A and 114B and respective conductive cables 116A and 116B. Although the connector assembly 100 is shown in FIG. 1 as including only two conductive cables 116A and 116B and respective mating contacts 114A and 114B, the connector assembly 100 may include only one or more than two conductive cables 116 and respective mating contacts 114. For example, the connector assembly 100 may include one or more pairs of mating contacts 114 and one or more corresponding pairs of conductive cables 116.

As described above, the connector housing 102 may be a single piece of a material. For example, the connector housing 102 may be formed during a molding process where a resin or other fluid-like material is injected into a mold. In the illustrated embodiment, the connector housing 102 includes a plurality of components that are coupled together to form the connector housing 102. Each of the separate components (e.g., the housing cap 120, the main body 101, the cover 130, the recess plug 306) may comprise a single piece of material or be constructed from multiple parts.

As shown in FIG. 1, the housing cap 120 has the conductive cables 116A and 116B extending therethrough. The housing cap 120 is configured to be mounted to the loading side 104. However, in alternative embodiments, the housing cap 120 may be integrally formed with the connector housing 102 and include the loading side 104.

As shown in FIG. 1, the connector housing 102 has a length $L_1$, a width $W_1$, and a height $H_1$. The connector housing 102 may have a low-profile such that a larger dimension of the connector housing 102 (e.g., the length $L_1$) may extend along the longitudinal axis 190. A shorter dimension of the connector housing 102 (e.g., the height $H_1$) may extend along the mounting axis 192. For example, the wall sides 108 and 109 may extend along the height $H_1$ and be sized to permit the conductive cables 116A and 116B to be received within the connector housing 102. The height $H_1$ may be only slightly larger than an outer diameter $D_1$ (shown in FIG. 4A) of the conductive cables 116A and 116B as shown in FIG. 1. The non-mounting side 107 may comprise a substantially planar surface. More specifically, the non-mounting side 107 may have a smooth, continuous surface throughout the non-mounting side 107, except for the access window 110 provided therethrough. When the PV module and the mounting side 105 of the connector assembly 100 are attached, the connector assembly 100 is moved in a direction along the mounting axis 192 toward the PV module. In alternative embodiments, the PV module may be moved in a direction along the mounting axis 192 toward the mounting side 105.

Figure 2A:
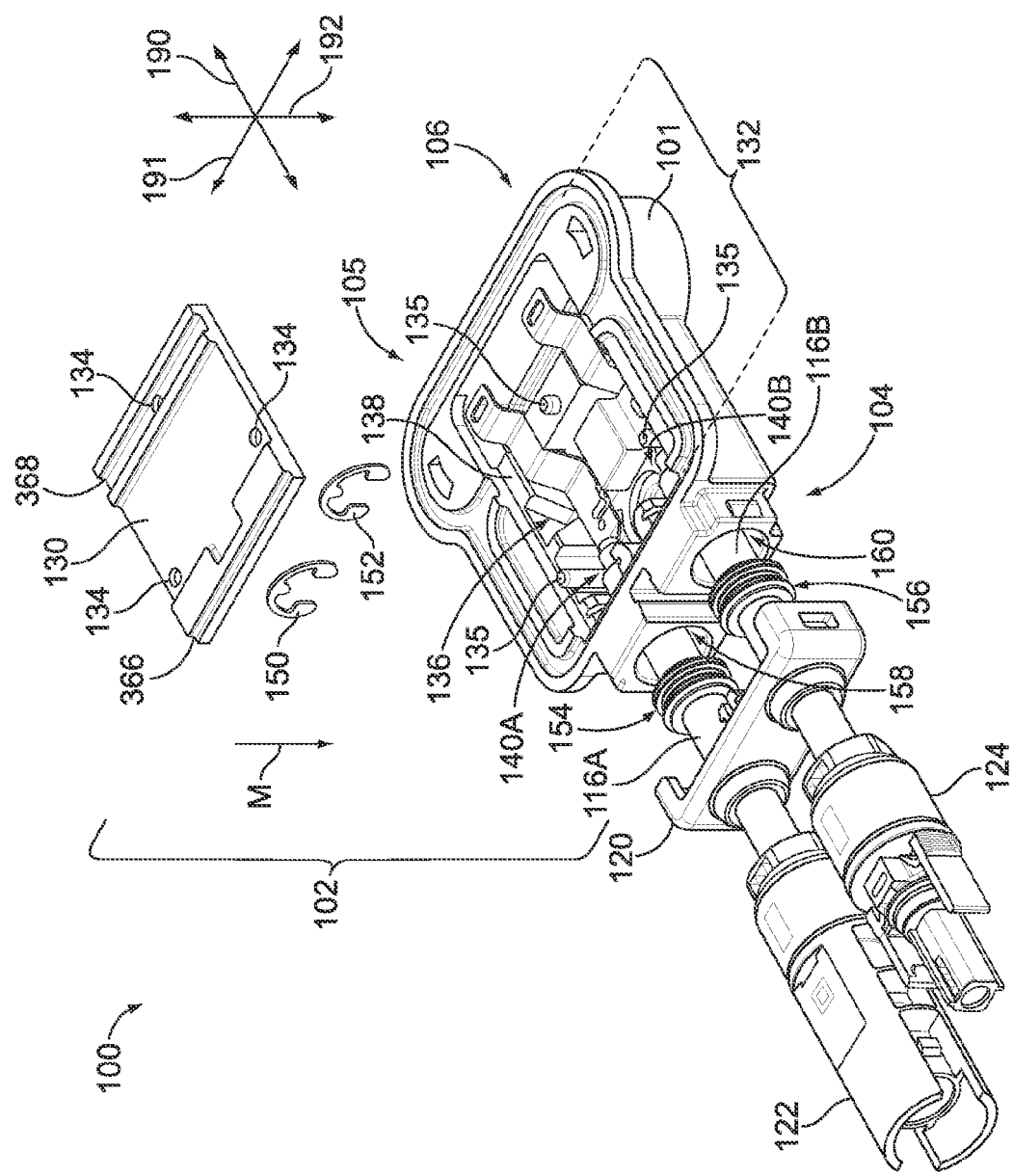
FIG. 2A is a partially exploded view of the connector assembly of FIG. 1.

FIG. 2A is a partially exploded view of the connector assembly 100. The orientation of the connector assembly 100 in FIG. 2A is upside-down with respect to the orientation of the connector assembly 100 in FIG. 1. As shown, the connector assembly 100 may include a first cable connector 122 that is coupled to the conductive cable 116A and a second cable connector 124 that is coupled to the conductive cable 116B. The first cable connector 122 may be referred to as a male cable connector and may be configured to communicatively engage a second cable connector of another connector assembly, such as a connector assembly that is similar to the connector assembly 100. The second cable connector 124 may be referred to as a female cable connector and may be configured to communicatively engage a first cable connector of another connector assembly. The connector assembly 100 may be part of an array of connector assemblies 100 that each electrically engage a corresponding PV module. For example, an array of PV modules may be mounted to a roof or other support structure. Each of the PV modules may be electrically coupled to an energy storage or delivery system through the corresponding connector assemblies 100.

As shown in FIG. 2A, the cover 130 may be configured to be coupled or mounted to a mounting surface 138 of the main body 101. The mounting surface 138 faces in a direction along the mounting axis 192. The mounting surface 138 may form a platform or platforms that surround at least a portion of an opening 132 to an inner space or region 136 of the connector housing 102. When the cover 130 is mounted to the mounting surface 138, the inner region 136 is enclosed by the main body 101 and the cover 130 and becomes an interior 137 (shown in FIG. 4A) of the connector assembly 100. The cover 130 may be secured to the mounting surface 138 (or the main body 101) by one or more fastening techniques. For example, the cover 130 may have a plurality of attachment openings 134 that form an interference/snap fit with corresponding attachment posts 135 of the main body 101. Alternatively or in addition to, the main body 101 may have an adhesive or sealant spread along the mounting surface 138 to facilitate adhering the cover 130 to the mounting surface 138. For example, the cover 130 may include sealant channels 366 and 368 that also align with the sealant channels along the mounting side 105 of the connector housing 102. The sealant may flow into the sealant channels 366 and 368 when applied. The sealant secures the connector assembly 100 to the surface of the PV module and may also facilitate preventing moisture or other unwanted materials from entering the connector housing. When the cover 130 is coupled to the mounting surface 138, a portion of the opening 132 becomes the access window 110 (FIG. 1).

The opening 132 of the main body 101 provides access to the inner region 136 of the connector assembly 100. A portion of the inner region 136 may become the power recess 112 (FIG. 1) after the cover 130 is coupled to the main body 101. As shown, the main body 101 may have inner surfaces that are shaped to form one or more features of the inner region 136 of the connector housing 102. For example, the main body 101 may include cable channels 140A and 140B in the inner region 136 that extend between the loading and mating sides 104 and 106. The cable channels 140A and 140B may open in a direction along the mounting axis 192 toward the cover 130. The conductive cables 116A and 116B are configured to be received within the cable channels 140A and 140B, respectively.

The connector assembly 100 may also include one or more retaining members 150 and 152. In particular embodiments, the retaining members 150 and 152 are configured to be inserted into the main body 101 before the cover 130 is coupled over the inner region 136 of the connector housing 102. For example, the retaining members 150 and 152 may be received by the main body 101 when the retaining members 150 and 152 are moved in a mounting direction M that is parallel to the mounting axis 192 and inserted into the main body 101. The retaining members 150 and 152 may be inserted before the cover 130 is coupled to the mounting surface 138. The retaining members 150 and 152 are configured to be held by the main body 101 or the connector housing 102 and may couple to the respective conductive cables 116A and 116B therein.

When the cover 130 is coupled to the main body 101, the conductive cables 116A and 116B and retaining members 150 and 152 are enclosed within the interior 137 (FIG. 4A) of the connector assembly 100. As such, the retaining members 150 and 152 may prevent the conductive cables 116A and 116B from being inadvertently withdrawn from the cable channels 140A and 140B during the manufacture of the connector assembly 100 and/or during operation and use of the connector assembly 100. More specifically, the retaining members 150 and 152 may prevent movement of the conductive cables 116A and 116B with respect to the connector housing 102 or the main body 101 in a direction that is along the longitudinal axis 190. As such, the retaining members 150 and 152 may facilitate providing cable strain relief for the connector assembly 100.

Also shown in FIG. 2A, the connector assembly 100 may include one or more cable seals 154 and 156 that surround corresponding conductive cables 116A and 116B. The cable seals 154 and 156 are configured to be compressed around the conductive cables 116A and 116B. The connector housing 102 may include seal cavities 158 and 160 located proximate to the loading side 104 of the connector housing 102. For example, the main body 101 may include the seal cavities 158 and 160. The seal cavities 158 and 160 are sized and shaped to receive and hold the cable seals 154 and 156, respectively, therein. After the cable seals 154 and 156 are inserted into the respective seal cavities 158 and 160, the housing cap 120 may be coupled to the main body 101. The housing cap 120 and the main body 101 may be sized and shaped with respect to each other to form an interference fit therewith.

Figure 2B:
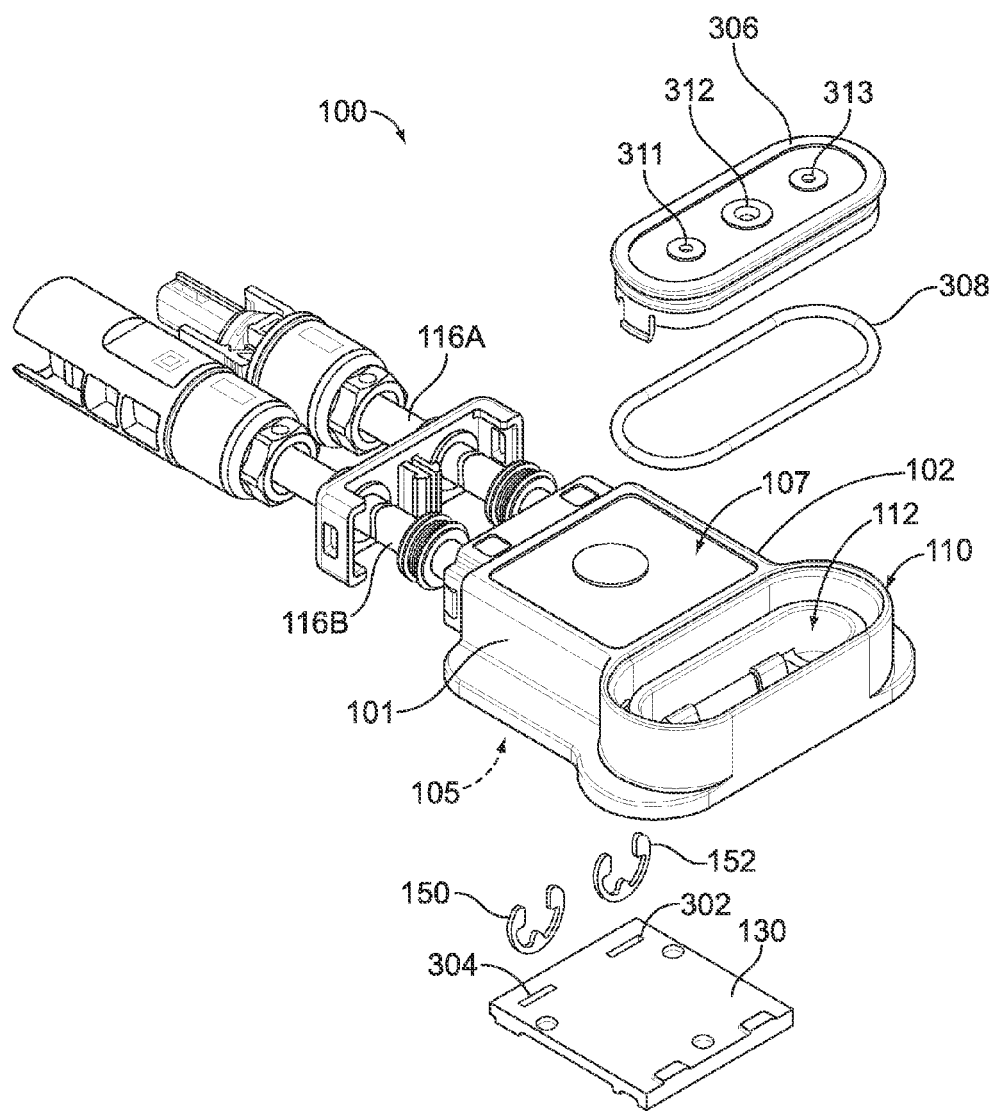
FIG. 2B is an inverted view of the connector assembly shown in FIG. 2A.

FIG. 2B is an exploded perspective view of the connector assembly 100 showing the non-mounting side 107. As shown, the cover 130 may include a pair of notches 302 and 304. The notches 302 and 304 may receive a portion of the retaining members 152 and 150 when the cover 130 is attached to the mounting surface 138 (FIG. 2A). The notches 302 and 304 may facilitate holding the retaining members 152 and 150 within the interior 137 (FIG. 4A) and preventing movement of the conductive cables 116B and 116A.

Also shown in FIG. 2B, the connector assembly 100 may include a recess plug 306 and a sealing ring 308 (e.g., o-ring). The sealing ring 308 may be coupled to and surround the recess plug 306. The recess plug 306 may then be inserted through the access window 110 and attached to the non-mounting side 107 to cover at least a portion of the access window 110 and enclose the power recess 112 therein. The recess plug 306 may have a plurality of conduits 311-313 that provide access to the power recess 112 when the recess plug 306 is attached to the main body 101. For example, the conduit 312 may permit injection of a potting material into the power recess 112 and the conduits 311 and 313 may permit the displacement of air from the power recess 112 when the potting material is inserted therein.

Figure 3:
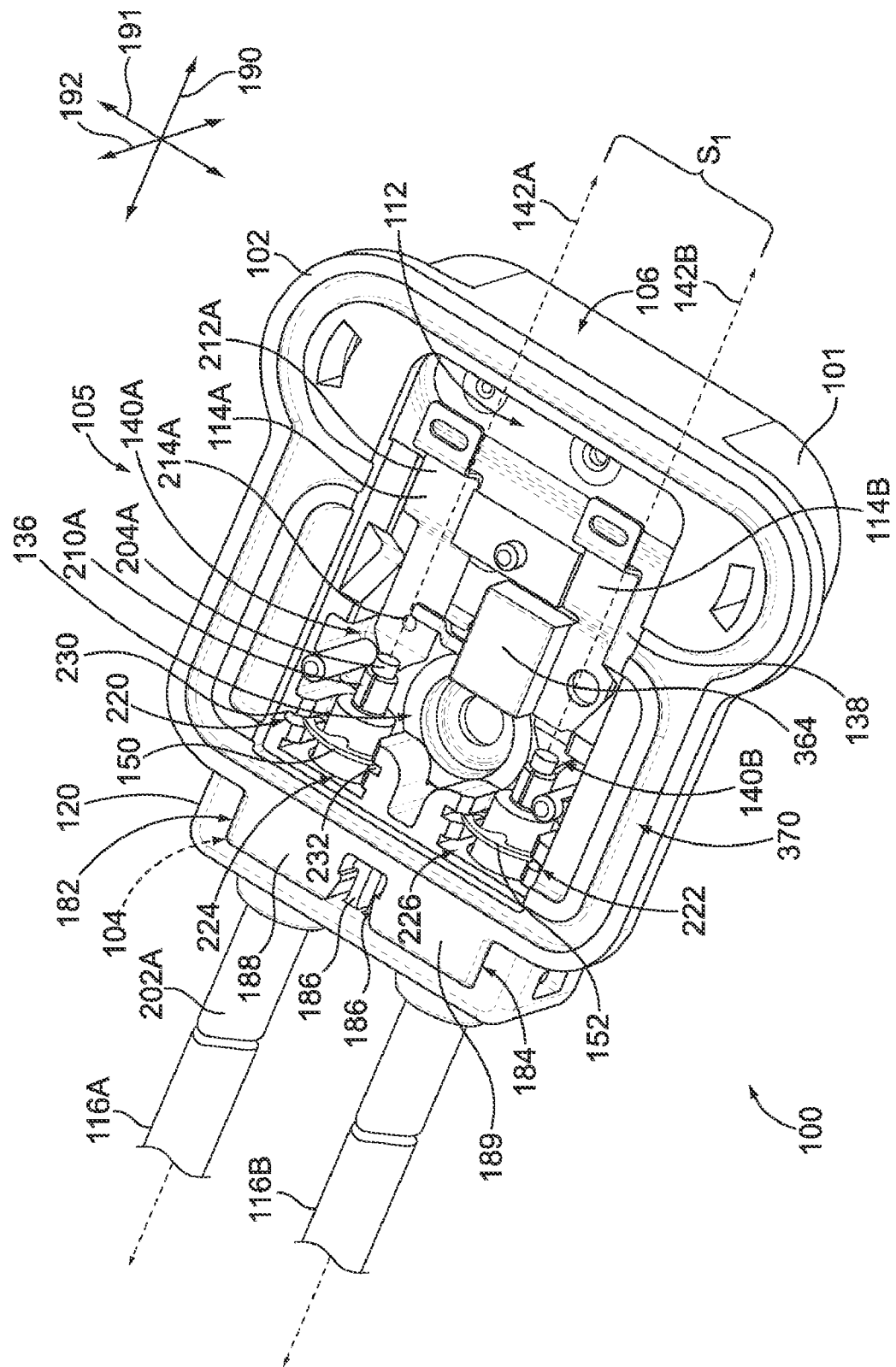
FIG. 3 is a perspective view of the connector assembly of FIG. 1 illustrating internal components in greater detail.

FIG. 3 illustrates in greater detail internal components of the connector assembly 100. For illustrative purposes, the cover 130 (FIG. 2A) has been removed from FIG. 3. As shown, the conductive cables 116A and 116B extend along respective central cable axes 142A and 142B within the cable channels 140A and 140B. The cable axes 142A and 142B may extend in a direction that is parallel to the longitudinal axis 190. The cable channels 140A and 140B may be separated from each other by a spacing $S_1$ therebetween. Also shown, the housing cap 120 is coupled to the main body 101 proximate to the loading side 104 of the connector housing 102. The housing cap 120 may comprise a single piece of insulative material and be configured to form an interference fit with the main body 101. For example, the housing cap 120 may include a pair of cap recesses 182 and 184 that are separated by cap projections 186. The cap recesses 182 and 184 are configured to receive corresponding housing or body portions 188 and 189 of the main body 101. The body portions 188 and 189 are formed around the seal cavities 158 and 160 (FIG. 2A), respectively. The body portions 188 and 189 receive and hold the cable seals 154 and 156 (FIG. 2A), respectively, within the seal cavities 158 and 160. The cap projections 186 flex toward each other when engaging the body portions 188 and 189 and grip the body portions 188 and 189.

Although the following description is with specific reference to the conductive cable 116A and the cable channel 140A, the description may be similarly applied to the conductive cable 116B and the cable channel 140B. The conductive cable 116A includes an insulative jacket or sleeve 202A and a conductor 204A. The insulative jacket 202A surrounds the conductor 204A and extends about the cable axis 142A when the conductive cable 116A is in the cable channel 140A. As shown, a portion of the insulative jacket 202A has been removed from a distal end of the conductive cable 116A so that the conductor 204A is exposed within the inner region 136 of the connector housing 102.

Furthermore, the conductive cable 116A may have the mating contact 114A coupled to the conductor 204A within the connector housing 102. In particular embodiments, the mating contact 114A may be coupled to the conductor 204A within the cable channel 140A and extend from the conductor 204A toward the mating side 106 of the connector housing 102. As shown, the mating contact 114A may have a base portion 210A and a mating portion 212A. The base portion 210A may be crimped or compressed around the conductor 204A so that the mating contact 114A is coupled thereto. The base portion 210A extends along the cable channel 140A to the mating portion 212A. As shown, the mating portion 212A extends toward the mating side 106 and is located within the power recess 112. The mating portion 212A is configured to electrically engage the PV module. The mating portion 212A (or the mating contact 114A) may be configured to flex with respect to the conductor 204A when engaged with the PV module.

As shown in FIG. 3, the base portion 210A is crimped around the conductor 204A and extends therefrom toward the mating side 106. The base portion 210A may also include a coupling bore 214A that receives a pin or post 216A (shown in FIG. 4A) of the main body 101. The post may facilitate holding the mating contact 114A in a predetermined position during the manufacture of the connector assembly 100. The base portion 210A extends toward the mating side 106 and is shaped into the mating portion 212A. For example, the mating portion 212A may extend in a direction along the mounting axis 192 and then extend along the longitudinal axis 190 into the power recess 112. The mating contacts 114A and 114B may extend a portion of the cable channels 140A and 140B.

In addition, the connector housing 102 or the main body 101 may include a plurality of slots 220 and 222 that are configured to hold the retaining members 150 and 152. As shown, the slots 220 and 222 are oriented substantially transverse to the respective cable channels 140A and 140B. Each of the slots 220 and 222 extend through the cable channel 140A and 140B, respectively. More specifically, the slot 220 is defined by first and second slot portions 230 and 232 that extend radially away from the cable channel 140A in substantially opposite directions along the lateral axis 191. The slot portions 230 and 232 may be extensions of the cable channel 140A in that the slot portions 230 and 232 define empty space that extends from the empty space of the cable channel. More specifically, the slot portions 230 and 232 may open to the cable channel 140A and face each other across the cable channel 140A. The slot portions 230 and 232 directly oppose each other across the cable channel 140A so that retaining member 150 is held substantially transverse to the cable axis 142A. Furthermore, as shown in FIG. 3, the slot portions 230 and 232 may extend into the mounting surface 138. The description of slot 220 provided above may be similarly applied to the slot 222 of the cable channel 140B.

In the illustrated embodiment, the cable channels 140A and 140B may also include slots 224 and 226. The slots 224 and 226 may also be oriented substantially transverse to the respective cable channels 140A and 140B. The slots 224 and 226 may be located closer to the loading side 104 than the slots 220 and 222. Furthermore, the slots 224 and 226 may have similar or different dimensions relative to the slots 220 and 222. In the illustrated embodiment, the slots 224 and 226 are sized and shaped to hold a smaller retaining member than the retaining members 150 and 152. Alternatively, the slots 224 and 226 may be sized and shaped to hold a retaining member that is equal to or larger than the retaining members 150 and 152. As such, the connector assembly 100 may be configured to accommodate different sizes of conductive cables.

Also shown in FIG. 3, the connector assembly 100 may include a bypass diode 364 located between the cable conductors 116A and 116B. The bypass diode 364 is configured to be electrically connected to the mating contacts 114A and 114B. The bypass diode 364 permits current to flow therethrough between the mating contacts 114A and 114B when the PV module (not shown) is shaded (i.e., when the PV module is not converting solar energy into electrical energy).

The main body 101 may also have a sealant channel or channels 370 located along an underside of the main body 101 or mounting side 105. When the cover 130 is attached to the mounting surface 138, the sealant channels 366 and 368 (FIG. 2A) may align with one or more sealant channels 370 of the main body 101. The sealant may facilitate holding the cover 130 to the main body 101 and/or preventing moisture and other contaminants from entering the interior 137 (FIG. 4A).

FIG. 4A is a cross-section of the connector assembly 100 after the cover 130 has been coupled to the mounting surface 138 of the main body 101. Although the following description is with specific reference to the conductive cable 116A and cable channel 140A, the description may similarly be applied to the conductive cable 116B and the cable channel 140B (FIG. 2A). In some embodiments, the connector assembly 100 may be constructed by providing the main body 101, the cover 130, the housing cap 120, and a cable assembly 240. The cable assembly 240 may include the conductive cable 116A, the mating contact 114A coupled to the conductor 204A, and the cable seal 154 surrounding an outer surface 242 of the insulative jacket 202A. As shown, the main body 101 includes an aperture 244 proximate to the loading side 104 of the connector housing 102. The aperture 244 may include the seal cavity 158. In particular embodiments, the cable assembly 240 may have the housing cap 120 coupled thereto. More specifically, the conductive cable 116A may be inserted through a hole 246 of the housing cap 120.

In some embodiments, the cable assembly 240 is first inserted through the aperture 244 of the main body 101. The mating contact 114A may advance through the aperture 244 followed by the conductor 204A and the insulative jacket 202A of the conductive cable 116A. In particular embodiments, the mating contact 114A is coupled to the connector housing 102 or the main body 101 by inserting the post 216A through the coupling bore 214A (FIG. 3). The cable seal 154 may then be advanced along the insulative jacket 202A and inserted into the seal cavity 158 of the aperture 244. The insulative material of the body portion 188 completely surrounds the aperture 244 about the cable axis 142A. As shown, the seal cavity 158 and the cable seal 154 are sized and shaped relative to each other so an interference fit or a snug fit is formed. Also shown, the cable seal 154 may be compressed around the outer surface 242 of the insulative jacket 202A to prevent unwanted moisture or contaminants from entering the interior 137 of the connector assembly 100. To this end, the cable seal 154 may have one or more ribs 250 that are compressed around the insulative jacket 202A. The housing cap 120 may then be coupled to the main body 101. In the illustrated embodiment, the housing cap 120 includes the loading side 104. The housing cap 120 may facilitate holding the cable seal 154 within the seal cavity 158.

Before, after, or during the insertion of the cable seal 154 into the seal cavity 158 and the coupling of the housing cap 120 to the main body 101, the retaining member 150 may be inserted into the slot 220. More specifically, the retaining member 150 may be moved in a mounting direction M that extends along the mounting axis 192 (FIG. 1) and is substantially orthogonal to the cable axis 142A. The retaining member 150 may be moved toward the mounting surface 138 and into the slot 220 to grip the conductive cable 116A. As shown in FIG. 4A, the retaining member 150 may have a narrow width $W_2$ measured along the cable axis 142A. Furthermore, the retaining member 150 may have a height $H_2$ (FIG. 5) that is slightly greater than the outer diameter $D_1$ of the conductive cable 116A. The height $H_2$ is slightly smaller than the height $H_1$ (FIG. 1) of the connector housing 102. As such, in particular embodiments, the connector assembly 100 may have a low-profile shape.

In particular embodiments, after inserting the retaining member 150 into the slot 220, the cover 130 may be coupled to the mounting surface 138 (e.g., through interference fit and/or providing a sealant). The retaining member 150 may be received within the notch 304 (FIG. 2B). The notch 304 may become a part of the slot 220 that holds the retaining member 150 therein. As shown in FIG. 4A, the cover 130 holds the conductive cable 116A and the retaining member 150 within the cable channel 140A and the slot 220, respectively. The retaining member 150 prevents movement of the conductive cable 116A with respect to the connector housing 102 in a direction along the cable axis 142A. Furthermore, the cable seal 154, the main body 101, and the cover 130 prevent movement of the conductive cable 116A out of the cable channel 140A in a direction along the mounting axis 192 and/or lateral axis 191 (FIG. 1).

In the illustrated embodiment, the retaining member 150 is located between the mating contact 114A and the cable seal 154. In alternative embodiments, however, the cable seal 154 may be located between the retaining member 150 and the mating contact 114A.

FIG. 4B is a cross-section taken along the lateral axis 191 through the power recess 112. As shown, the recess plug 306 may have opposite latches 360 and 362 that are configured to flex and grip portions of the main body 101 when the recess plug 306 is attached thereto. In the illustrated embodiment, the sealing ring 308 may be applied to the recess plug 306 before coupling to the main body 101. The sealing ring 308 may surround the recess plug 306 and cooperate with the recess plug 306 and the main body 101 to prevent moisture and contaminants from entering the power recess 112.

Figure 5:
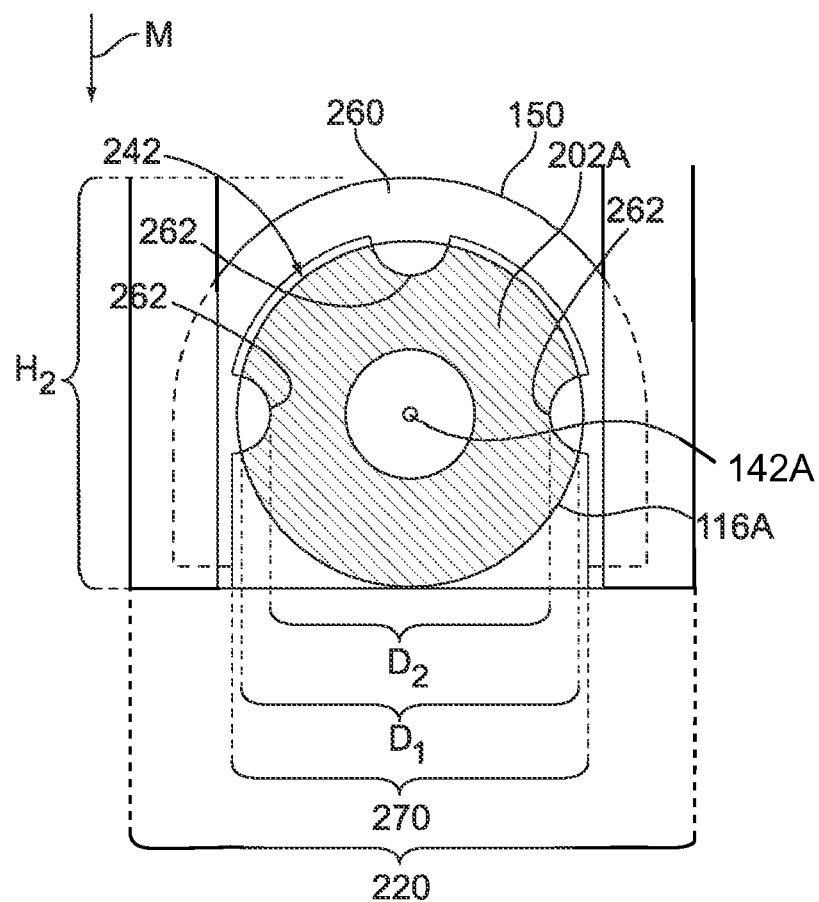
FIG. 5 illustrates the retaining member of FIG. 4A engaged with the conductive cable.

FIG. 5 is a view along the cable axis 142A illustrating the retaining member 150 inserted into the slot 220 and gripping the conductive cable 116A. In particular embodiments, the retaining member 150 is an E-retaining ring or clip. As shown, the retaining member 150 includes an annular portion 260 that extends around the outer surface 242 of the conductive cable 116A. The annular portion 260 may also extend around the cable axis 142A. As such, the annular portion 260 may define a cable-reception region 270 that is shaped to receive the conductive cable 116A. Also shown, the retaining member 150 may include at least one grip element 262 that is configured to grip the insulative jacket 202A. The grip elements 262 are coupled to and project radially inward from the annular portion 260 toward the cable axis 142A and/or the insulative jacket 202A. In the illustrated embodiment, the retaining member 150 includes three grip elements 262. However, in alternative embodiments, the retaining member 150 may include only one grip element, two grip elements, or more than three grip elements. In addition, the grip elements 262 are not limited to the shapes shown in FIG. 5, but may have other shapes that facilitate gripping the insulative jacket 202A. For example, the retaining member 150 may be bracket-shaped and have grip elements that are similar to the grip elements 356 and 358 shown in FIG. 6.

In the illustrative embodiment, the grip elements 262 grip the conductive cable 116A by piercing material of the insulative jacket 202A such that a portion of the grip element 262 extends through the outer surface 242 and is inserted into the insulative jacket 202A. Accordingly, in the illustrated embodiment, the grip elements 262 may be shaped to facilitate piercing the insulative jacket 202A when the retaining member 150 is inserted into the slot 220 in the mounting direction M. For example, the grip elements 262 may have sharp edges capable of piercing the insulative jacket 202A. The grip elements 262 may be substantially evenly distributed about the cable axis 142A. When the grip elements 262 pierce the material of the insulative jacket, the grip elements 262 may provide a grip diameter $D_2$ that is less than the outer diameter $D_1$ of the conductive cable 116A. If a force is exerted on the conductive cable 116A in a direction that is along the cable axis 142A, the grip elements 262 prevent the conductive cable 116A from being moved in the cable channel 140A.

However, in alternative embodiments, the grip elements 262 do not pierce the insulative jacket 202A. For example, the grip elements 262 may be shaped to have dull contact points that engage the insulative jacket 202A. As such, the grip elements 262 may compress the insulative jacket 202A, but not pierce the outer surface 242.

Figure 6:
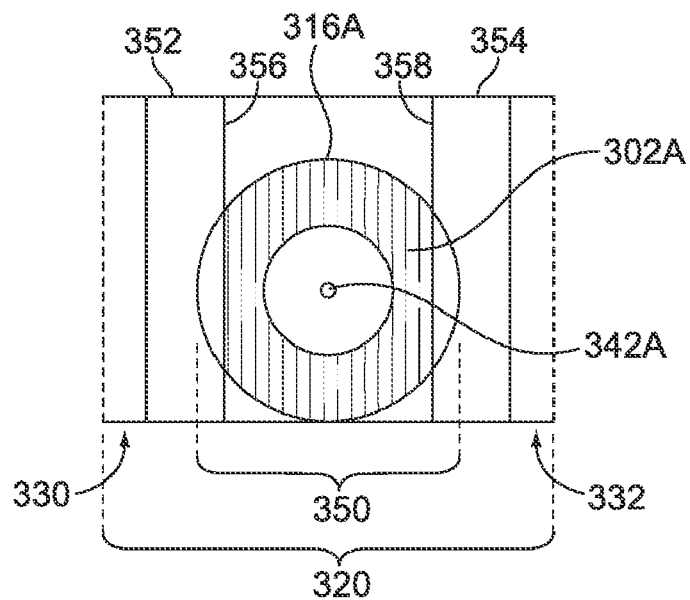
FIG. 6 illustrates a retaining member formed in accordance with another embodiment engaged with a conductive cable.

FIG. 6 is a view along a cable axis 342A illustrating a retaining member 350 of an alternative embodiment inserted into a slot 320 to grip a conductive cable 316A. As shown, the retaining member 350 may include separate retaining components 352 and 354. Each retaining component 352 and 354 includes at least one grip element 356 and 358, respectively, that is configured to grip an insulative jacket 302A of the conductive cable 316A. The retaining components 352 and 354 may be rectangular-shaped parts and the grip elements 356 and 358 may be edges of the parts. The grip elements 356 and 358 may pierce the insulative material of the conductive cable 316A. The retaining component 352 may be inserted into the slot portion 330 and the retaining component 354 may be inserted into the slot portion 332. The retaining components 352 and 354 may be inserted separately or simultaneously into the respective slot portions 330 and 332.

It is to be understood that the above description is intended to be illustrative, and not restrictive. In addition, the above-described embodiments (and/or aspects or features thereof) may be used in combination with each other. Furthermore, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An electrical connector assembly configured to be coupled to a photovoltaic (PV) module:
   a connector housing having a plurality of housing sides and an inner region defined therebetween, the housing sides including opposite loading and mating sides, the connector housing having a cable channel located in the inner region that extends between the loading and mating sides and a slot that is oriented substantially transverse to the cable channel, the slot extending through the cable channel;

a conductive cable received in the cable channel and extending along a central cable axis, the conductive cable having an outer surface and being configured to electrically engage the PV module; and a retaining member inserted into the slot, the retaining member surrounding the conductive cable about the cable axis and gripping the outer surface of the conductive cable, the retaining member and the slot preventing the conductive cable from being inadvertently moved with respect to the connector housing in a direction along the cable axis.

2. The connector assembly in accordance with claim 1, wherein the retaining member is configured to be inserted into the slot in a mounting direction that is substantially orthogonal to the cable axis.

3. The connector assembly in accordance with claim 1, wherein the retaining member includes an annular portion that extends around the cable axis and at least one grip element coupled to the annular portion and projecting radially inward toward the conductive cable.

4. The connector assembly in accordance with claim 1, wherein the conductive cable includes an insulative jacket that includes the outer surface of the conductive cable, the retaining member piercing or compressing material of the insulative jacket when the retaining member is inserted into the slot.

5. The connector assembly in accordance with claim 1, wherein the connector housing includes an aperture that provides access to the cable channel through the loading side, the conductive cable being inserted into the cable channel through the aperture.

6. The connector assembly in accordance with claim 5, wherein the connector housing comprises a single piece of insulative material, the aperture being completely surrounded about the cable axis by the insulative material.

7. The connector assembly in accordance with claim 5, wherein the aperture is sized and shaped to receive a cable seal that surrounds the conductive cable, the cable seal being compressed against the outer surface to protect the inner region of the connector housing from an ambient environment.

8. The connector assembly in accordance with claim 7, wherein the connector housing includes a housing cap that holds the cable seal within the aperture.

9. The connector assembly in accordance with claim 1, wherein the slot includes first and second slot portions that extend radially away from the cable channel in substantially opposite directions.

10. The connector assembly in accordance with claim 1, wherein the conductive cable is a pair of conductive cables and the retaining member is a pair of retaining members.

11. The connector assembly in accordance with claim 1, wherein the connector housing includes a mounting surface that extends between the loading and mating sides, the cable channel opening to the mounting surface.

12. The connector assembly in accordance with claim 11, further comprising a cover coupled to the mounting surface, the cover holding the conductive cable and the retaining member within the cable channel and the slot, respectively.

13. An electrical connector assembly configured to be coupled to a photovoltaic (PV) module, the connector assembly comprising:

a plurality of housing sides including opposite loading and mating sides and a mounting surface extending therebetween;

a cable channel extending between the loading and mating sides along the mounting surface, the cable channel being sized and shaped to receive a conductive cable so that the conductive cable extends along a cable axis when located within the cable channel; and a slot sized and shaped to have a retaining member inserted therein, the slot oriented substantially transverse to the cable channel so that the retaining member extends substantially transverse to the cable axis, the slot opening to the mounting surface so that the retaining member is insertable into the slot in a mounting direction that is orthogonal to the cable axis.

14. The connector assembly in accordance with claim 13 further comprising a cover that is configured to be mounted to the mounting surface and hold the conductive cable and the retaining member within the cable channel and the slot, respectively, when mounted to the mounting surface.

15. The connector assembly in accordance with claim 13 further comprising an aperture that provides access to the cable channel through the loading side, the conductive cable being insertable into the cable channel through the aperture.

16. The connector assembly in accordance with claim 13 further comprising a main body formed from a single piece of insulative material that is shaped to include the housing sides, the cable channel, and the slot.

17. The connector assembly in accordance with claim 13 further comprising a housing cap configured to engage the conductive cable.

18. The connector assembly in accordance with claim 13, wherein the slot includes first and second slot portions that extend radially away from the cable channel in substantially opposite directions.

19. The connector assembly in accordance with claim 13, wherein the cable channel includes a plurality of cable channels and the slot includes a plurality of slots.

20. The connector assembly in accordance with claim 13 further comprising the conductive cable and the retaining member.

* * * * *